Patented Apr. 26, 1932

1,855,984

UNITED STATES PATENT OFFICE

HERMANN OEHME, OF COLOGNE-KALK, GERMANY, ASSIGNOR TO CHEMISCHE FABRIK KALK GESELLSCHAFT MIT BESCHRANKTER HAFTUNG, OF COLOGNE-KALK, GERMANY

PROCESS OF PRODUCING CONCENTRATED GASEOUS HYDROCHLORIC ACID

No Drawing. Application filed July 3, 1930, Serial No. 465,788, and in Germany April 22, 1930.

My invention relates to improvements in the process of producing concentrated gaseous hydrochloric acid.

There exist certain reactions in which it is necessary to employ concentrated gaseous hydrochloric acid. This kind of hydrochloric acid was hitherto produced by the action of concentrated sulphuric acid on alkali chlorides or by mixing a large quantity of concentrated sulphuric acid with dilute aqueous hydrochloric acid or by the combination of chlorine with hydrogen.

Although these known processes enable the production and application of concentrated gaseous hydrochloric acid, they frequently involve great drawbacks for works requiring hydrochloric acid. If the hydrochloric acid is, for instance, produced from sodium chloride and sulphuric acid, it is necessary to produce sodium sulphate or sodium bisulphate. This manufacture is, however, profitable on a large scale only, while the demand for concentrated hydrochloric acid is frequently not large enough to justify a sulphate plant for own use. The expulsion of gaseous hydrochloric acid from an aqueous hydrochloric acid by means of concentrated sulphuric acid requires the concentration of large quantities of sulphuric acid.

Finally the production of hydrochloric acid from chlorine and hydrogen is tied to the carrying out of the alkali electrolysis.

The manufacture of concentrated gaseous hydrochloric acid by physical means at ordinary temperatures calls for very high pressures so that the reduction to practice of this idea encounters great difficulties.

I have now ascertained that it is possible to bring gaseous hydrochloric acid in an easy manner and in a portable state ready for immediate application, by making use of the addition-compounds of hydrochloric acid with metal sulphates well known in the art. Some of these compounds, such as

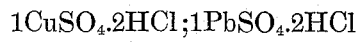

$1CuSO_4.2HCl; 1PbSO_4.2HCl$ are at ordinary temperatures a dry powdery substance from which the additive hydrochloric acid may be expelled again by heating to 30° to 200° C., as well known in the art. After the expulsion of the hydrochloric acid the metal sulphates are again in the state in which they may be used as a carrier for hydrochloric acid. The manufacture of these addition-compounds may, for instance, take place by treating anhydrous copper sulphate with the hydrochloric vapors escaping from a bisulphate retort. The anhydrous copper sulphate absorbs under vigorous heating two molecules hydrogen chloride, a yellow-brownish powder being produced which at ordinary temperatures possesses practically no hydrochloric acid pressure. This powdery addition-product which has about 30 p. c. hydrochloric acid added may be transported to the site of consumption in casks or barrels. By heating to 100°–150° C. the additive acid may be expelled, whereupon a finely pulverized anhydrous copper sulphate remains behind which may be returned to the hydrochloric acid factory and again be converted into the addition-product. In this way it is possible to make in a simple manner use of the concentrated gaseous hydrochloric acid at the place where it is required without the necessity of operating a special sulphate-hydrochloric acid plant or sulphuric acid concentration plant, or an alkali electrolyzing plant.

Instead of the copper sulphate, lead sulphate or cadmium sulphate may also be employed as carriers for hydrochloric acid, but the copper sulphate is particularly suitable, on the one hand because the raw material is cheap, on the other hand because the concentration of the hydrochloric acid lies above 30 p. c. and finally because the hydrochloric acid may be driven off quantitatively already at moderate temperatures, viz. at 100° to 150° C.

The metal phosphates, for instance lead phosphate, act in a similar manner to the metal sulphates, and likewise form addition-products with gaseous hydrochloric acid which have similar properties to the hydrochloric metal sulphates and likewise give off gaseous hydrochloric acid on heating.

I claim as my invention:—

1. The process of producing concentrated gaseous hydrochloric acid which consists in allowing gaseous hydrochloric acid vapors to act on sulphates of heavy metals for the purpose of forming addition-compounds, and expelling the gaseous hydrochloric acid from said addition-compounds by the application of heat.

2. The process of producing concentrated gaseous hydrochloric acid which consists in allowing gaseous hydrochloric acid vapors to act on phosphates of heavy metals for the purpose of forming addition-compounds, and expelling the gaseous hydrochloric acid from said addition-compounds by the application of heat.

3. The process of producing concentrated gaseous hydrochloric acid which consists in allowing gaseous hydrochloric acid vapors to act on sulphates of heavy metals for the purpose of forming addition-compounds, expelling the gaseous hydrochloric acid from said addition-compounds by the application of heat, and employing the metal sulphates freed from hydrochloric acid again for binding hydrochloric acid.

4. The process of producing concentrated gaseous hydrochloric acid which consists in allowing gaseous hydrochloric acid vapors to act on phosphates of heavy metals for the purpose of forming addition-compounds, and expelling the gaseous hydrochloric acid from said addition-compounds by the application of heat, and employing the metal phosphates freed from hydrochloric acid again for binding hydrochloric acid.

5. The process of producing concentrated gaseous hydrochloric acid which consists in allowing gaseous hydrochloric acid vapors to act on compounds of heavy metals for the purpose of forming addition-compounds, and expelling the gaseous hydrochloric acid from said addition-compounds by the application of heat.

In testimony whereof I affix my signature.

HERMANN OEHME.